(12) United States Patent
Pannicke et al.

(10) Patent No.: US 11,244,378 B2
(45) Date of Patent: Feb. 8, 2022

(54) SYSTEMS AND METHODS FOR TRACKING PROMOTIONS

(71) Applicant: BXB Digital Pty Limited, Sydney (AU)

(72) Inventors: Marco Pannicke, Cologne (DE); Shankar Jayaraman, Fremont, CA (US)

(73) Assignee: BXB DIGITAL PTY LIMITED, Sydney (AU)

( * ) Notice: Subject to any disclaimer, the term of this patent is extended or adjusted under 35 U.S.C. 154(b) by 738 days.

(21) Appl. No.: 15/947,188

(22) Filed: Apr. 6, 2018

(65) Prior Publication Data

US 2018/0293645 A1 Oct. 11, 2018

Related U.S. Application Data

(60) Provisional application No. 62/483,169, filed on Apr. 7, 2017.

(51) Int. Cl.
| | | |
|---|---|---|
| *G06Q 30/06* | (2012.01) | |
| *G06Q 30/02* | (2012.01) | |
| *H04W 4/021* | (2018.01) | |
| *H04W 4/35* | (2018.01) | |
| *G06Q 10/08* | (2012.01) | |
| *G06Q 10/00* | (2012.01) | |

(52) U.S. Cl.
CPC ......... *G06Q 30/0639* (2013.01); *G06Q 10/00* (2013.01); *G06Q 10/08* (2013.01); *G06Q 10/0833* (2013.01); *G06Q 30/0201* (2013.01); *H04W 4/021* (2013.01); *H04W 4/35* (2018.02); *G06Q 30/02* (2013.01)

(58) Field of Classification Search
CPC .... G06Q 30/0639; G06Q 10/00; G06Q 10/08; G06Q 10/0833; G06Q 30/0201; H04W 4/35; H04W 4/021
USPC .......................................................... 705/28
See application file for complete search history.

(56) References Cited

U.S. PATENT DOCUMENTS

| | | |
|---|---|---|
| 681,428 A | 8/1901 | Ambrose |
| 5,438,607 A | 8/1995 | Przygoda, Jr. et al. |
| 5,491,486 A | 2/1996 | Welles, II et al. |

(Continued)

FOREIGN PATENT DOCUMENTS

| | | |
|---|---|---|
| CA | 2185354 | 9/1995 |
| DE | 9306107 | 8/1994 |

(Continued)

OTHER PUBLICATIONS

Cho et al.; Design and Implementation of an Active RFID System Platform (Year: 2005).*

(Continued)

*Primary Examiner* — Florian M Zeender
*Assistant Examiner* — Nicole Elena Bruner
(74) *Attorney, Agent, or Firm* — Kilpatrick Townsend & Stockton LLP

(57) ABSTRACT

Provided are methods, including computer-implemented methods, devices, and computer-program products applying promotion tracking. According to some embodiments of the invention, industry users may determine where a promotional pallet is in the store, the removal of promotional goods from the promotional pallet, and/or user interaction with the promotional pallet.

18 Claims, 12 Drawing Sheets

(56) References Cited

U.S. PATENT DOCUMENTS

| | | |
|---|---|---|
| 5,691,980 A | 11/1997 | Welles, II et al. |
| 5,774,876 A | 6/1998 | Woolley et al. |
| 5,844,482 A | 12/1998 | Guthrie et al. |
| 6,199,488 B1 | 3/2001 | Favaron et al. |
| 6,294,114 B1 | 9/2001 | Muirhead |
| 6,373,389 B1 | 4/2002 | Przygoda, Jr. et al. |
| 6,415,223 B1 | 7/2002 | Lin et al. |
| 6,483,434 B1 | 11/2002 | Umiker |
| 6,600,418 B2 | 7/2003 | Francis et al. |
| 6,661,339 B2 | 12/2003 | Muirhead |
| 6,669,089 B2 | 12/2003 | Cybulski et al. |
| 6,700,533 B1 | 3/2004 | Werb et al. |
| 6,707,381 B1 | 3/2004 | Maloney |
| 6,717,517 B2 | 4/2004 | Przygoda, Jr. |
| 6,718,888 B2 | 4/2004 | Muirhead et al. |
| 6,749,418 B2 | 6/2004 | Muirhead |
| 6,814,287 B1 | 11/2004 | Chang et al. |
| 6,900,815 B2 | 5/2005 | Yoshioka |
| 6,934,625 B2 | 8/2005 | Haddad |
| 6,943,678 B2 | 9/2005 | Muirhead |
| 7,026,937 B2 | 4/2006 | Przygoda, Jr. |
| 7,034,683 B2 | 4/2006 | Ghazarian |
| 7,100,052 B2 | 8/2006 | Ghazarian |
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,242,306 B2 | 7/2007 | Wildman et al. |
| 7,252,230 B1 | 8/2007 | Sheikh et al. |
| 7,313,476 B2 | 12/2007 | Nichols et al. |
| 7,336,152 B2 | 2/2008 | Horwitz et al. |
| 7,336,167 B2 | 2/2008 | Olsen, III et al. |
| 7,336,182 B1 | 2/2008 | Baranowski et al. |
| 7,342,496 B2 | 3/2008 | Muirhead |
| 7,365,737 B2 | 4/2008 | Marvit et al. |
| 7,388,492 B2 | 6/2008 | Watanabe |
| 7,398,153 B2 | 7/2008 | Workman et al. |
| 7,400,259 B2 | 7/2008 | O'Connor et al. |
| 7,443,297 B1 | 10/2008 | Baranowksi et al. |
| 7,446,658 B2 | 11/2008 | Panotopoulus |
| 7,564,357 B2 | 7/2009 | Baranowski et al. |
| 7,633,389 B2 | 12/2009 | Montovani et al. |
| 7,656,278 B2 | 2/2010 | Onishi et al. |
| 7,668,596 B2 | 2/2010 | Von Arx et al. |
| 7,735,430 B2 | 6/2010 | Muirhead |
| 7,742,745 B2 | 6/2010 | Twitchell, Jr. |
| 7,752,980 B2 | 7/2010 | Muirhead |
| 7,783,423 B2 | 8/2010 | Verma et al. |
| 7,789,024 B2 | 9/2010 | Muirhead |
| 7,804,400 B2 | 9/2010 | Muirhead |
| 7,874,256 B2 | 1/2011 | Muirhead |
| 7,903,084 B2 | 3/2011 | Marvit et al. |
| 7,948,371 B2 | 5/2011 | Muirhead |
| 7,956,746 B2 | 6/2011 | Truscott et al. |
| 7,963,235 B2 | 6/2011 | Muirhead |
| 7,999,670 B2 | 8/2011 | McClellan et al. |
| 8,036,826 B2 | 10/2011 | MacIntosh et al. |
| 8,041,079 B2 | 10/2011 | Chiu et al. |
| 8,077,040 B2 | 12/2011 | Muirhead |
| 8,095,070 B2 | 1/2012 | Twitchell, Jr. |
| RE43,178 E | 2/2012 | Ghazarian |
| 8,111,157 B2 | 2/2012 | Diener et al. |
| 8,159,338 B2 | 4/2012 | Breed |
| 8,184,852 B2 | 5/2012 | Hofman et al. |
| 8,204,439 B2 | 6/2012 | Twitchell, Jr. |
| 8,210,107 B2 | 7/2012 | Muirhead |
| 8,219,558 B1 | 7/2012 | Trandal et al. |
| 8,229,473 B1 | 7/2012 | De La Rue |
| 8,248,242 B2 | 8/2012 | Caliri et al. |
| 8,269,605 B2 | 9/2012 | Moore |
| 8,313,594 B2 | 11/2012 | Muirhead |
| 8,331,862 B2 | 12/2012 | Twitchell, Jr. |
| 8,347,794 B2 | 1/2013 | Muirhead |
| 8,511,555 B2 | 8/2013 | Babcock et al. |
| 8,514,058 B2 | 8/2013 | Cameron |
| 8,585,850 B2 | 11/2013 | Muirhead |
| 8,594,923 B2 | 11/2013 | Wong et al. |
| 8,630,768 B2 | 1/2014 | McClellan et al. |
| 8,692,764 B2 | 4/2014 | Marvit et al. |
| 8,694,251 B2 | 4/2014 | Janardhanan et al. |
| 8,718,372 B2 | 5/2014 | Holeva et al. |
| 8,830,072 B2 | 9/2014 | Batra et al. |
| 8,849,007 B2 | 9/2014 | Holeva et al. |
| 8,977,032 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,230,227 B2 | 1/2016 | Muirhead |
| 9,466,198 B2 | 10/2016 | Burch et al. |
| 9,488,986 B1 | 11/2016 | Solanki |
| 9,504,414 B2 | 11/2016 | Coza et al. |
| 9,613,239 B2 | 4/2017 | Lee et al. |
| 9,635,346 B2 | 4/2017 | Iida |
| 9,656,485 B2 | 5/2017 | Asai et al. |
| 9,679,237 B2 | 6/2017 | Linkesch et al. |
| 9,813,850 B2 | 11/2017 | Lee et al. |
| 9,868,212 B1 | 1/2018 | Hinterstoisser |
| 9,947,196 B2 | 4/2018 | Lee et al. |
| 9,965,662 B2 | 5/2018 | Lee et al. |
| 10,102,629 B1 | 10/2018 | Li |
| 10,242,273 B1 | 3/2019 | Eckman |
| 10,328,578 B2 | 6/2019 | Holz |
| 10,339,619 B2 | 7/2019 | Muirhead |
| 10,346,797 B2 | 7/2019 | Jacobus et al. |
| 10,347,005 B2 | 7/2019 | Iida et al. |
| 10,368,222 B2 | 7/2019 | Carlson et al. |
| 10,491,375 B2 | 11/2019 | Maggu et al. |
| 10,549,885 B2 | 2/2020 | de Bokx et al. |
| 10,614,319 B2 | 4/2020 | Douglas et al. |
| 10,816,637 B2 | 10/2020 | Conners et al. |
| 2002/0047850 A1 | 4/2002 | Yoshioka |
| 2002/0070862 A1 | 6/2002 | Francis et al. |
| 2003/0083964 A1 | 5/2003 | Horwitz et al. |
| 2003/0089771 A1 | 5/2003 | Cybulski et al. |
| 2003/0137968 A1 | 7/2003 | Lareau et al. |
| 2003/0170357 A1 | 9/2003 | Garwood |
| 2004/0015264 A1 | 1/2004 | Holland et al. |
| 2004/0103031 A1 | 5/2004 | Weinschenk |
| 2004/0113786 A1 | 6/2004 | Maloney |
| 2004/0233041 A1 | 11/2004 | Bohman et al. |
| 2005/0046567 A1 | 3/2005 | Mortenson et al. |
| 2005/0063590 A1 | 3/2005 | Simon et al. |
| 2005/0226489 A1 | 10/2005 | Beach et al. |
| 2005/0231366 A1 | 10/2005 | McHugh et al. |
| 2006/0232412 A1 | 10/2006 | Tabacman et al. |
| 2006/0254474 A1 | 11/2006 | Roth et al. |
| 2006/0261959 A1 | 11/2006 | Worthy et al. |
| 2007/0091292 A1 | 4/2007 | Cho et al. |
| 2007/0095905 A1 | 5/2007 | Kadaba |
| 2007/0108296 A1 | 5/2007 | Konopka et al. |
| 2007/0282482 A1 | 12/2007 | Beucher et al. |
| 2008/0052205 A1* | 2/2008 | Dolley ............... G06Q 10/087 705/28 |
| 2008/0106468 A1 | 5/2008 | Litva et al. |
| 2008/0114487 A1 | 5/2008 | Schuler et al. |
| 2008/0143484 A1 | 6/2008 | Twitchell |
| 2008/0198001 A1* | 8/2008 | Sarma ............... G06Q 10/087 340/539.1 |
| 2009/0101712 A1* | 4/2009 | Ulrich ............... G06Q 10/087 235/383 |
| 2010/0006377 A1 | 1/2010 | McCabe |
| 2010/0299278 A1 | 11/2010 | Kriss et al. |
| 2010/0310182 A1 | 12/2010 | Kroepfl et al. |
| 2010/0332407 A1 | 12/2010 | Grieve et al. |
| 2011/0040440 A1 | 2/2011 | de Oliveira et al. |
| 2011/0054979 A1* | 3/2011 | Cova ............... G06Q 10/06 705/7.37 |
| 2011/0095871 A1 | 4/2011 | Kail et al. |
| 2011/0169636 A1 | 7/2011 | Kadaba |
| 2011/0227725 A1 | 9/2011 | Muirhead |
| 2011/0251920 A1 | 10/2011 | Watson |
| 2011/0266338 A1 | 11/2011 | Babcock et al. |
| 2012/0066511 A1 | 3/2012 | Scheidt et al. |

(56) References Cited

U.S. PATENT DOCUMENTS

| | | |
|---|---|---|
| 2012/0105202 A1 | 5/2012 | Gits et al. |
| 2012/0126000 A1 | 5/2012 | Kunzig et al. |
| 2012/0166241 A1* | 6/2012 | Livingston ......... G06Q 10/0631 |
| | | 705/7.12 |
| 2012/0232430 A1 | 9/2012 | Boissy et al. |
| 2012/0239499 A1 | 9/2012 | Zughaib et al. |
| 2012/0252501 A1 | 10/2012 | Smith et al. |
| 2012/0323431 A1 | 12/2012 | Wong et al. |
| 2013/0041290 A1 | 2/2013 | Kording et al. |
| 2013/0041617 A1 | 2/2013 | Pease et al. |
| 2013/0045760 A1 | 2/2013 | Obermeyer et al. |
| 2013/0101230 A1 | 4/2013 | Holeva et al. |
| 2013/0324151 A1 | 12/2013 | Lee et al. |
| 2014/0016821 A1 | 1/2014 | Arth et al. |
| 2014/0049392 A1 | 2/2014 | Wagner |
| 2014/0062774 A1 | 3/2014 | Hale et al. |
| 2014/0120945 A1 | 5/2014 | Sharma et al. |
| 2014/0193077 A1 | 7/2014 | Shiiyama et al. |
| 2014/0222711 A1 | 8/2014 | Tibbs et al. |
| 2014/0289020 A1 | 9/2014 | Schullian et al. |
| 2014/0297485 A1 | 10/2014 | Steely et al. |
| 2014/0304123 A1* | 10/2014 | Schwartz ............. G06Q 10/087 |
| | | 705/28 |
| 2015/0039529 A1 | 2/2015 | Barakat |
| 2015/0120597 A1 | 4/2015 | Dertadian |
| 2015/0127496 A1 | 5/2015 | Marathe et al. |
| 2015/0134403 A1* | 5/2015 | Schwartz ........... G06Q 30/0623 |
| | | 705/7.29 |
| 2015/0146989 A1 | 5/2015 | Shiiyama et al. |
| 2015/0379510 A1 | 12/2015 | Smith |
| 2016/0021636 A1 | 1/2016 | Krallman et al. |
| 2016/0063550 A1 | 3/2016 | Caldwell |
| 2016/0189000 A1 | 6/2016 | Dube et al. |
| 2016/0198341 A1 | 7/2016 | Fransen |
| 2016/0198431 A1 | 7/2016 | Pattabiraman et al. |
| 2016/0205500 A1 | 7/2016 | Lee et al. |
| 2016/0205654 A1 | 7/2016 | Robinson |
| 2016/0239706 A1 | 8/2016 | Dijkman et al. |
| 2016/0259339 A1* | 9/2016 | High .................... G05D 1/0246 |
| 2016/0260059 A1 | 9/2016 | Benjamin et al. |
| 2016/0260301 A1 | 9/2016 | Miller et al. |
| 2016/0321729 A1 | 11/2016 | Westphal |
| 2017/0015111 A1 | 1/2017 | Asai et al. |
| 2017/0019264 A1 | 1/2017 | Nugent et al. |
| 2017/0140408 A1 | 5/2017 | Wuehler |
| 2017/0193438 A1* | 7/2017 | Jones ................. G06K 17/0022 |
| 2017/0243103 A1 | 8/2017 | Linkesch et al. |
| 2017/0323412 A1 | 11/2017 | Muirhead |
| 2017/0366357 A1 | 12/2017 | Pattanaik et al. |
| 2017/0372103 A1 | 12/2017 | Lee et al. |
| 2018/0009234 A1 | 1/2018 | Ohi et al. |
| 2018/0038805 A1 | 2/2018 | Heikkila et al. |
| 2018/0039524 A1 | 2/2018 | Dettori et al. |
| 2018/0082390 A1 | 3/2018 | Leidner et al. |
| 2018/0089638 A1 | 3/2018 | Christidis et al. |
| 2018/0143995 A1 | 5/2018 | Bailey et al. |
| 2018/0196680 A1 | 7/2018 | Wang et al. |
| 2018/0217250 A1* | 8/2018 | Cristache ............... G01S 13/876 |
| 2018/0232693 A1 | 8/2018 | Gillen et al. |
| 2018/0268348 A1 | 9/2018 | Guan |
| 2018/0304468 A1 | 10/2018 | Holz |
| 2018/0322453 A1 | 11/2018 | Lantz et al. |
| 2018/0342032 A1 | 11/2018 | Daigle et al. |
| 2019/0012637 A1 | 1/2019 | Gillen |
| 2019/0019144 A1 | 1/2019 | Gillen |
| 2019/0057231 A1 | 2/2019 | Bandil et al. |
| 2019/0080392 A1 | 3/2019 | Youb et al. |
| 2019/0098432 A1 | 3/2019 | Carlson et al. |
| 2019/0109702 A1 | 4/2019 | Maggu et al. |
| 2019/0130345 A1 | 5/2019 | Antor et al. |
| 2019/0190719 A1 | 6/2019 | van de Ruit et al. |
| 2019/0251385 A1 | 8/2019 | Kotula |
| 2019/0259062 A1 | 8/2019 | Caldwell |
| 2019/0340623 A1 | 11/2019 | Rivkind et al. |
| 2019/0370816 A1 | 12/2019 | Hu |
| 2020/0019927 A1 | 1/2020 | Muirhead |
| 2020/0118117 A1 | 4/2020 | McManus et al. |
| 2020/0209343 A1 | 7/2020 | Connors et al. |
| 2020/0272986 A1 | 8/2020 | Bandil et al. |

FOREIGN PATENT DOCUMENTS

| | | |
|---|---|---|
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2006 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

Anonymous, "Geo-Fence", Wikipedia, Available Online at, URL:https://en.wikipedia.0rg/w/index.php?title=Geofence&oldid=768541623, Mar. 4, 2017, 3 pages.

International Application No. PCT/US2018/026461, "International Search Report and Written Opinion", dated Jul. 5, 2018, 16 pages.

GoTo Pallets inc. "The future of the pallet pooling industry begins with the G2 Pallet." Retrieved capture from http://gotopallets.com for the date of Oct. 1, 2016, 77 pages.

Roussel, J., "Making the Supply Chain Everyone's Business," May 9, 2014, 8 pages.

"Recommendations on the Grocery Industry Pallet System," written for the The Grocery Industry Pallet Subcommittee by Cleveland Consulting Associates, Jan. 1, 1992, 16 pages.

GoTo Pallets Marketing Brochure dated Oct. 12, 2016. Retrieved from http://gotopallets.com 8 pages.

Intermec's Intellitag RFID Technology Enables CHEP's. Global Pallet Tracking Business Wire Nov. 13, 2001: 0480.

International Search Report and Written Opinion for PCT/US2018/030659 dated Aug. 3, 2018, all pages.

International Search Report and Written Opinion for PCT/US2018/030672 dated Jul. 13, 2018, all pages.

International Preliminary Report on Patentability for PCT/US2018/030672 dated Nov. 14, 2019, all pages.

International Search Report and Written Opinion for PCT/US2018/031367 dated Aug. 1, 2018, all pages.

International Search Report and Written Opinion for PCT/US2018/034083 dated Oct. 24, 2018, 11 pages.

International Search Report and Written Opinion for PCT/US2018/045964 dated Nov. 19, 2018, all pages.

International Preliminary Report on Patentability for PCT/US2018/045964 dated Apr. 30, 2020, all pages.

International Search Report and Written Opinion for PCT/US2018/047035 dated Oct. 31, 2018, all pages.

International Preliminary Report on Patentability for PCT/US2018/047035 dated Mar. 5, 2020, all pages.

International Search Report and Written Opinion for PCT/US2018/048832 dated Oct. 30, 2018, all pages.

International Preliminary Report on Patentability for PCT/US2018/048832 dated May 2020, all pages.

International Search Report and Written Opinion for PCT/US2019/068476 dated Feb. 25, 2020, all pages.

International Search Report and Written Opinion for PCT/US2020/019698 dated Jun. 30, 2020, all pages.

Jihoon et al., "Geo-Fencing: Geographical-Fencing Based Energy-Aware Proactive Framework for Mobile Devices," Quality of Service (IWQOS), 2012 IEEE 20th International Workshop, Jun. 4, 2012, pp. 1-9.

Mohamed, "Detection and Tracking of Pallets using a Laser Rangefinder and Machine Learning Techniques," Retrieved from https://www.researchgate.net/profile/Ihab_S_Mohamed/publication/324165524_

(56) References Cited

OTHER PUBLICATIONS

Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).
Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", IEEE MultiMedia, IEEE Service Center, vol. 20, Issue 2, Apr. 2013, pp. 62-71.
G. Yang, K. Xu and V.O.K. Li, "Hybrid Cargo-Level Tracking System for Logistics," 2010 IEEE 71st Vehicular Technology Conference, Taipei, 2010, pp. 1-5, doi: 10.1109/VETECS.2010.5493655. (Year 2010).
International Preliminary Report on Patentability for PCT/US2018/026461 dated Jun. 25, 2019, all pages.
International Preliminary Report on Patentability for PCT/US2018/030659 dated Aug. 7, 2019, all pages.
International Preliminary Report on Patentability for PCT/US2018/031367 dated Sep. 6, 2019, all pages.
International Preliminary Report on Patentability for PCT/US2018/034083 dated Nov. 26, 2019, all pages.

\* cited by examiner

SYSTEMS AND METHODS FOR TRACKING PROMOTIONS

CROSS-REFERENCES TO RELATED APPLICATIONS

This application claims the benefit of U.S. Provisional Application No. 62/483,169, filed on Apr. 7, 2017, the entire contents of which are incorporated by reference herein for all purposes.

FIELD

The present disclosure generally relates to cargo transportation and presentation on pallets, and more specifically to systems and methods for tracking promotions utilizing pallet sensors.

BACKGROUND

Provided are methods, including computer-implemented methods, devices, and computer-program products applying promotion tracking. According to some embodiments of the invention, industry users may determine where a promotional pallet is in the store, the removal of promotional goods from the promotional pallet, and/or user interaction with the promotional pallet.

BRIEF SUMMARY

Provided are methods, including computer-implemented methods, devices, and computer-program products applying promotion tracking. According to some embodiments of the invention, industry users may determine where the promotional pallet is in the store, the removal of promotional goods from the promotional pallet, and/or interaction with the promotional pallet.

According to some embodiments of the invention, a computer-implemented method is provided. The method comprises acquiring an asset identifier from a beacon coupled to a physical asset. The asset identifier uniquely identifies the physical asset. The physical asset is associated with an entity. The method further comprises receiving a location indicator from a tracking device associated with the beacon. The location indicator is received using a first communication protocol associated with the beacon. The method further comprises querying a database for a record associated with the asset identifier that uniquely identifies the physical asset. The method further comprises extracting an expected location for the physical asset from the record associated with the asset identifier. The method further comprises determining a first threshold. The method further comprises generating a first differential between the location indicator and the expected location. When the first differential is greater than the first threshold, a first alert identifying an improper location of the physical asset is generated and transmitted. When the first differential is less than or equal to the first threshold, the database is queried for the asset identifier, and an expected position for the physical asset is extracted from the record associated with the asset identifier. When the first differential is less than or equal to the first threshold, the method further comprises triangulating a current position of the beacon within the expected location, wherein the current position is triangulated using one or more data pings, and wherein the current position is triangulated over a second communication protocol associated with the beacon; determining a second threshold; and generating a second differential between the current position and the expected position, wherein when the second differential is greater than the second threshold, a second alert identifying an improper position of the physical asset is generated and transmitted.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1A:
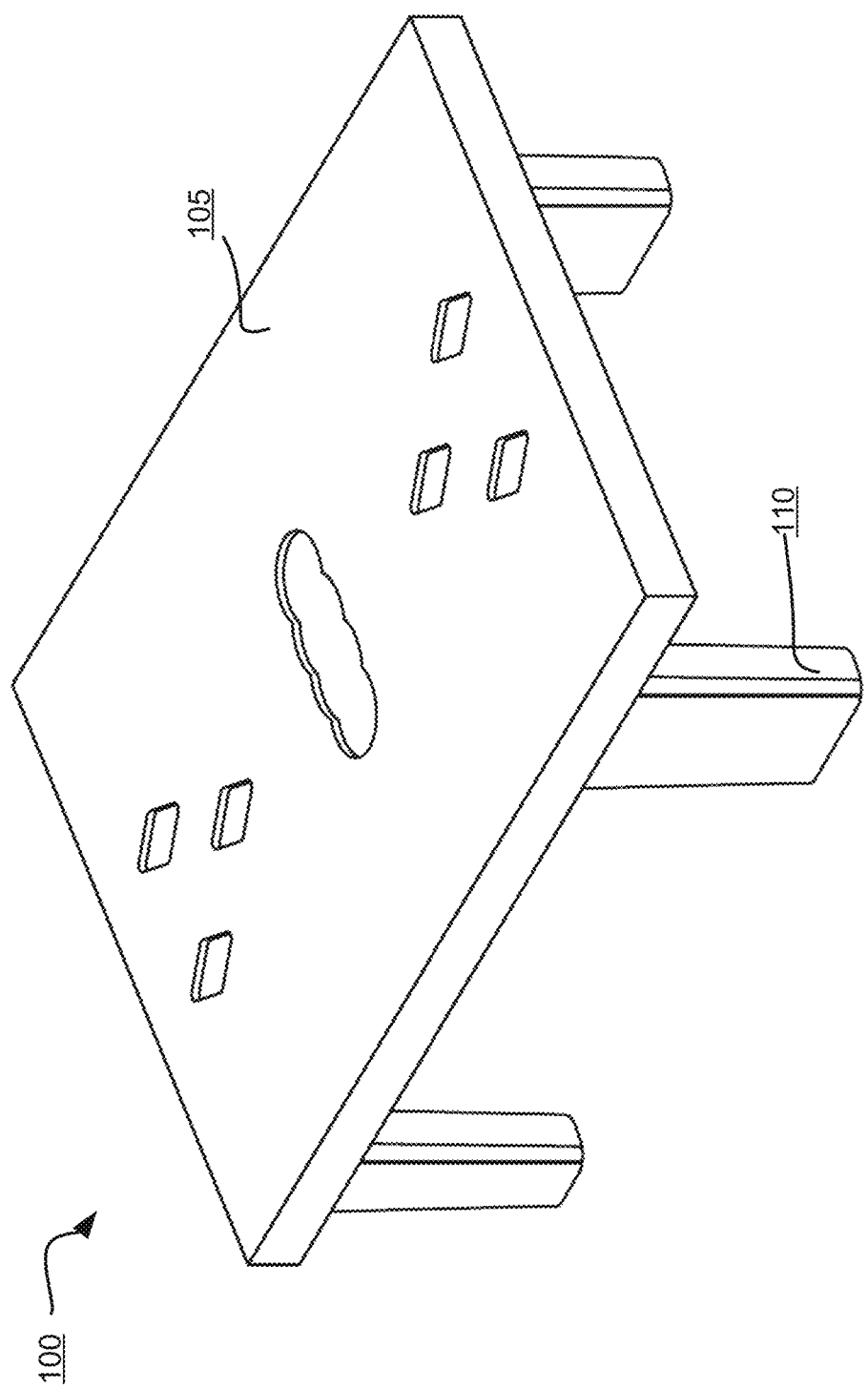
FIG. 1A is a top perspective view of a pallet, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

A pallet may be a structure that supports physical assets for storage, presentation, handling, and/or transportation. As used herein, the term "pallet" may be used to describe any load carrier, including any type of platform, dolly, container, and the like. The physical assets may be any physical assets, such as perishable or nonperishable physical goods. FIG. 1A is a top perspective view of a pallet 100, in accordance with some embodiments. The pallet 100 may include a base 105 and legs 110. The base 105 may be flat and/or otherwise configured to support the shape and/or weight of the physical asset to be held on the pallet 100. Although shown as having a particular design in FIG. 1A, it is contemplated that any design may be incorporated on or in the base 105. For example, the base 105 may have smaller, larger, fewer, more, differently shaped, or differently placed holes than those shown in FIG. 1A, depending on characteristics of the particular physical asset to be placed on the base 105 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having four legs 110, it is contemplated that the pallet 100 may have any suitable number of legs. For example, for heavier physical assets, the pallet 100 may include one or more additional legs centrally located with respect to the pallet 100 to prevent sagging of the base 105. Further, although shown and described as being in a particular orientation and having a particular size, it is contemplated that the legs 110 may be of any size (e.g., height, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. In some embodiments, the base 105 may be made of a same or different material than the legs 110. In some embodiments, the base 105 and the legs 110 may form a single unitary body (e.g., formed from a single mold). In some embodiments, the base 105 may be removable from one or more of the legs 110.

Figure 1B:
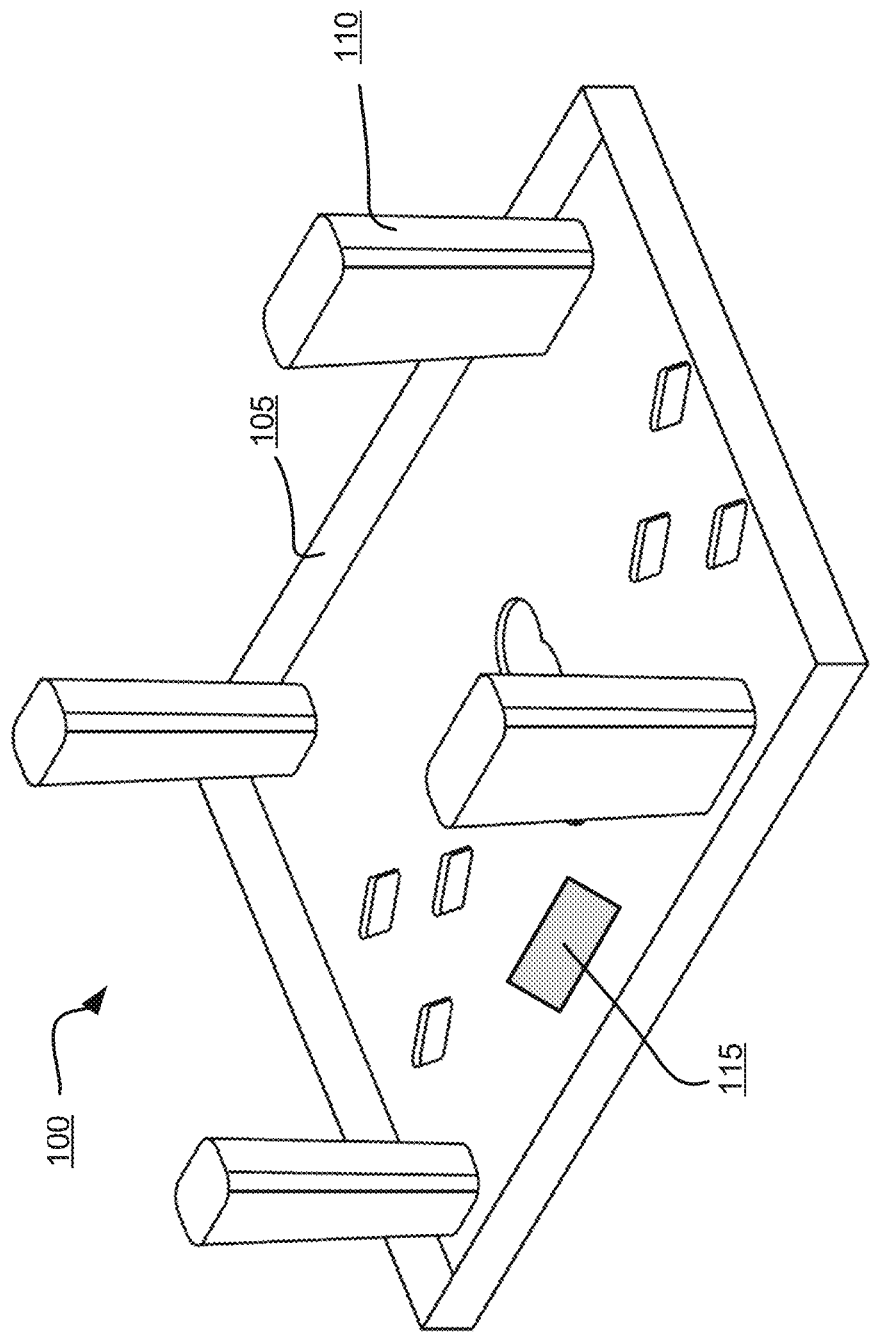
FIG. 1B is a bottom perspective view of a pallet with a beacon, in accordance with some embodiments.

In some embodiments, additional components may be integrated with the pallet 100. FIG. 1B is a bottom perspective view of the pallet 100, in accordance with some embodiments. The underside of the pallet 100 may include a beacon 115. The beacon 115 may include a number of different functionalities. For example, the beacon 115 may be programmed with the type of physical asset located on the pallet 100. The beacon 115 may further include or be in operable communication with one or more sensors configured to monitor certain conditions of the pallet 100 (e.g., environmental conditions, movements, etc.). The beacon 115 is described further herein with respect to FIG. 3. Although shown as being located in a particular position on the pallet 100, it is contemplated that the beacon 115 may be located in any suitable position on the pallet 100. Further, although shown as being substantially flat between four walls on the underside of the pallet 100, it is contemplated that the base 105 may include one or more reinforcement ribs between the four walls to further stabilize the pallet 100.

Figure 2A:
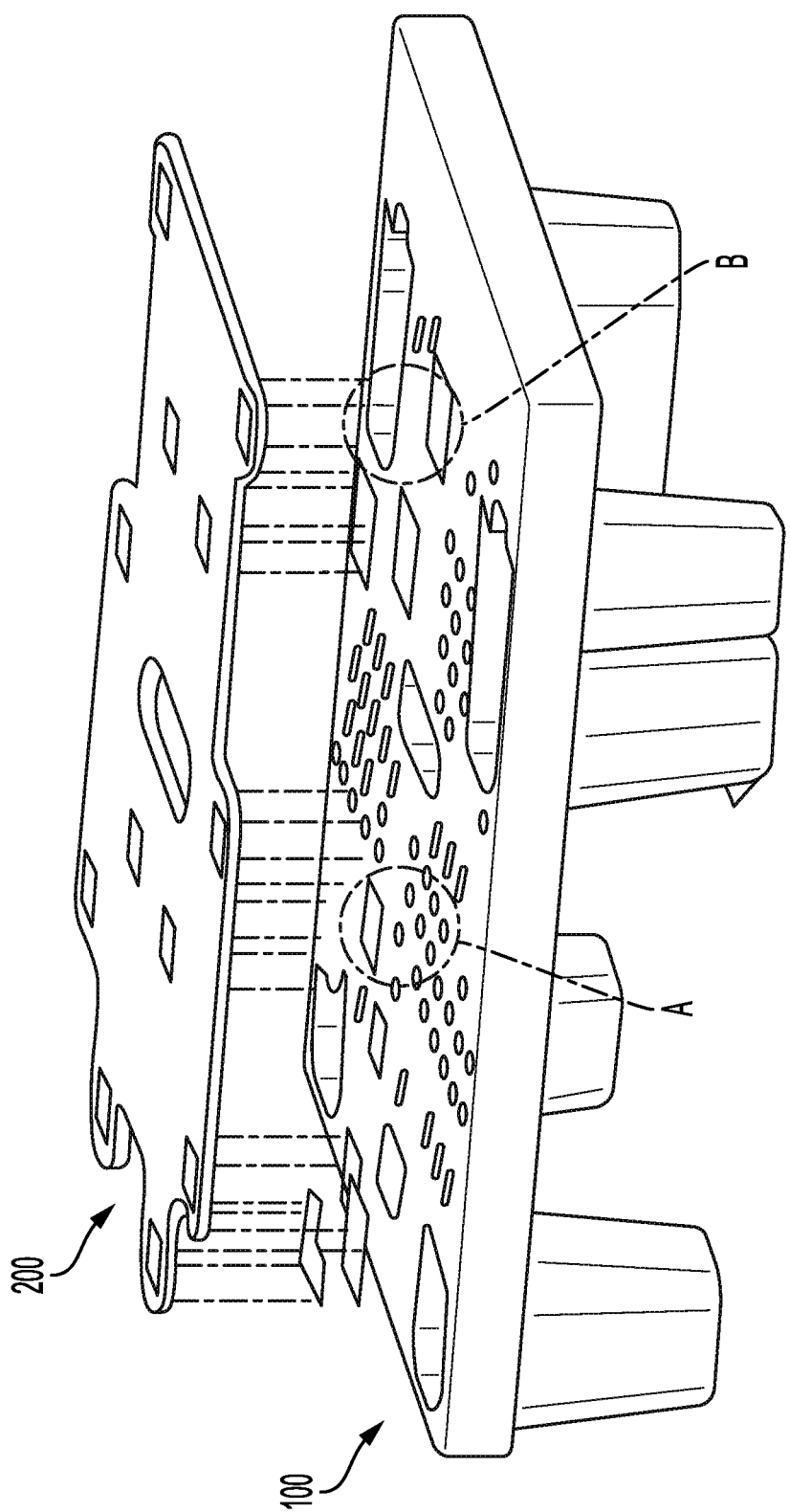
FIG. 2A is a side exploded perspective view of a pallet with a weight sensor, in accordance with some embodiments.

Another exemplary component that may be integrated with the pallet 100 is a weight sensor. FIG. 2A is a side exploded perspective view of the pallet 100 with a weight sensor 200, in accordance with some embodiments. Although illustrated in FIG. 2A as having a particular design, it is contemplated that the weight sensor 200 may have any suitable design, depending on characteristics of the load 220. For example, a uniformly distributed load 220 may have a differently designed weight sensor 200 than a load 220 carried on the perimeter, which may have a differently designed weight sensor 200 than a load carried only on one side. For example, the weight sensor 200 may be positioned on the front half of the pallet 100 if the pallet 100 is to be placed with its back side against the wall.

The weight sensor 200 may be made of any suitable material or combination of materials. The weight sensor 200 may be made from the same or different materials as the pallet 100. In one example, the weight sensor 200 may include a plastic plate with a softer top (e.g., duro plastic) and a harder bottom (e.g., thermoplastic or duro plastic with alu inlay). The weight sensor 200 may have any thickness. For example, in some embodiments, the weight sensor may have a 3-5 mm thickness.

Figure 2B:
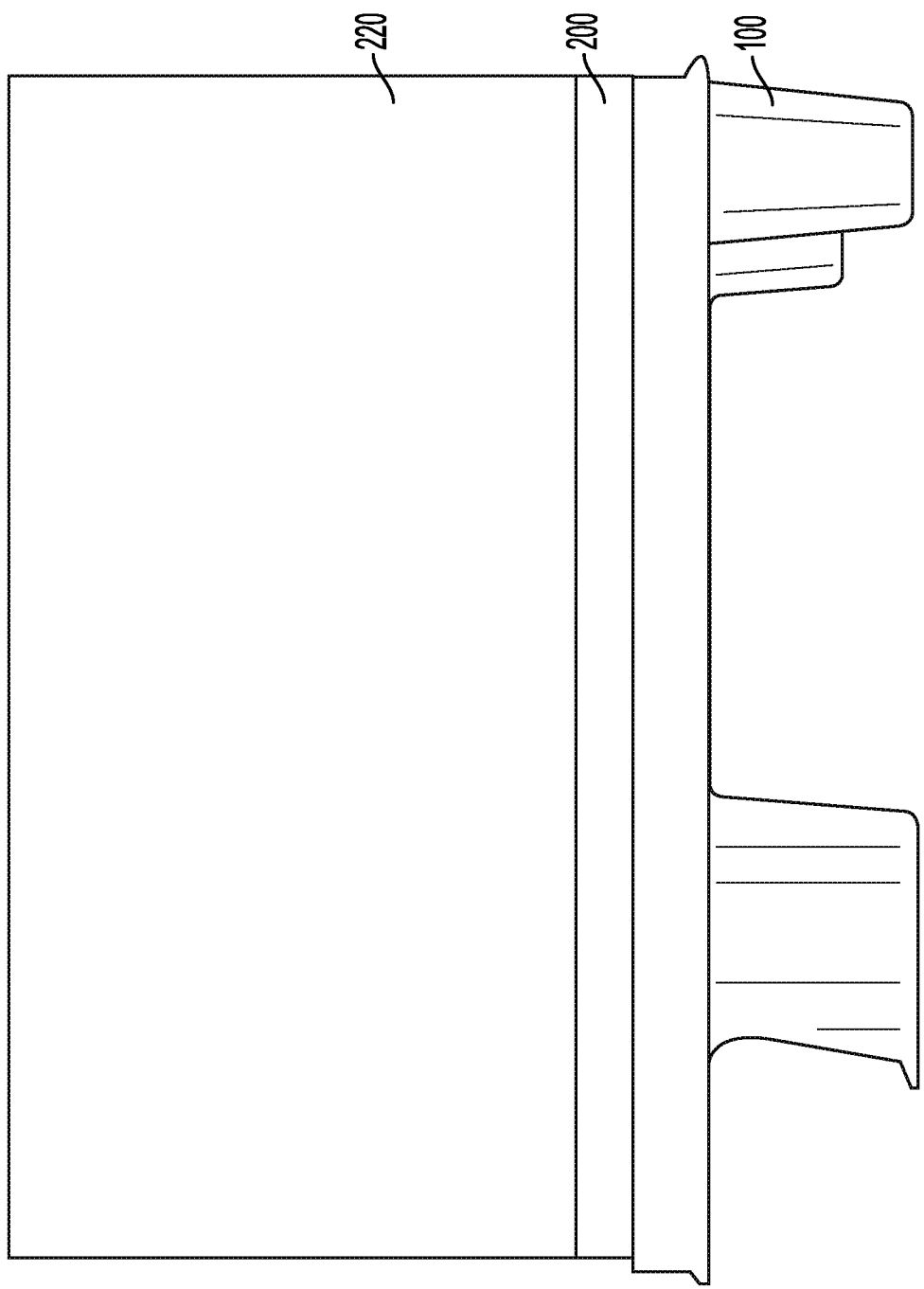
FIG. 2B is a side view of a pallet with a weight sensor and a load, in accordance with some embodiments.

FIG. 2A illustrates the weight sensor 200 as being entirely separate from the pallet 100 for explanation purposes only. It is contemplated that, in use, the weight sensor 200 may be positioned directly on top of and in contact with the pallet 100. In some embodiments, the weight sensor 200 may be removable and/or replaceable from the pallet 100, such as by being "clicked" in and out of the pallet 100. The pallet 100 and/or the weight sensor 200 may be sized, shaped, designed, and/or positioned to operatively couple to and/or be in contact with one another. FIG. 2B is a side view of the pallet 100 with the weight sensor 200 placed atop the pallet 100, in accordance with some embodiments. A load 220 may be placed atop the weight sensor 200.

Figure 2C:
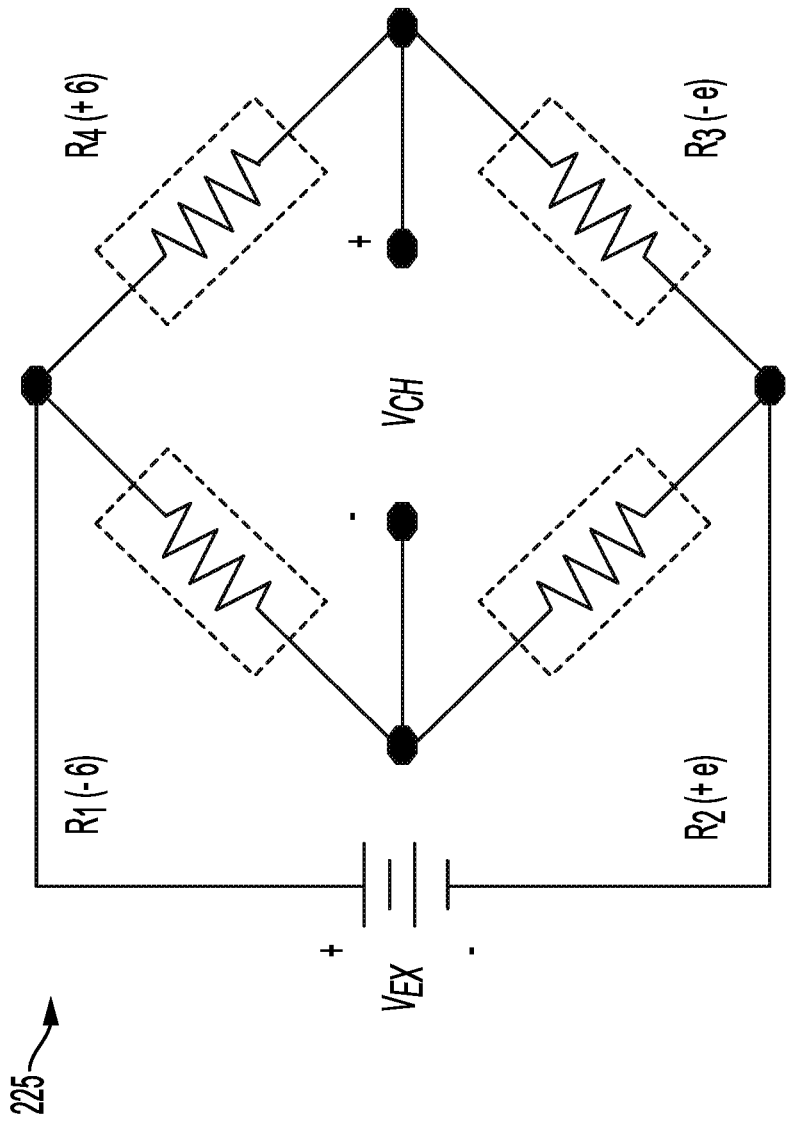
FIG. 2C is a schematic diagram illustrating exemplary circuitry for a weight sensor, in accordance with some embodiments.

The weight sensor 200 may include or be in operative communication with one set or multiple sets of circuitry for measuring the load 220 placed on the weight sensor 200 (and thus, on the pallet 100). The load 220 may be measured once, at certain intervals, randomly, continuously, and/or upon certain conditions. FIG. 2C is a schematic diagram illustrating exemplary circuitry 225 for a weight sensor 200, in accordance with some embodiments. The circuitry 225 may include a Wheatstone bridge. In some embodiments, the circuitry 225 may include two connected Wheatstone bridges as a full bridge. The full bridge may include two series parallel arrangements of resistances connected between voltages supplies. The full bridge may have two input and two output terminals includes four resistors each. Each resistor may act as an active strain gauge element. When a load 220 is added, removed, and/or changed, the resistance may change and the difference can be calculated to determine the weight of the load 220.

The circuitry 225 may be located at any position on the weight sensor 200 and/or the pallet 100, depending on characteristics of the load 220. For example, a load 220 carried on the perimeter of the pallet 100 may require the circuitry 225 to be positioned at multiple locations at the front and the back of the pallet 100. A load 220 carried on only the front side of the pallet 100 may require the circuitry 225 to be positioned only on the front half of the pallet, in any configuration.

Figure 3:
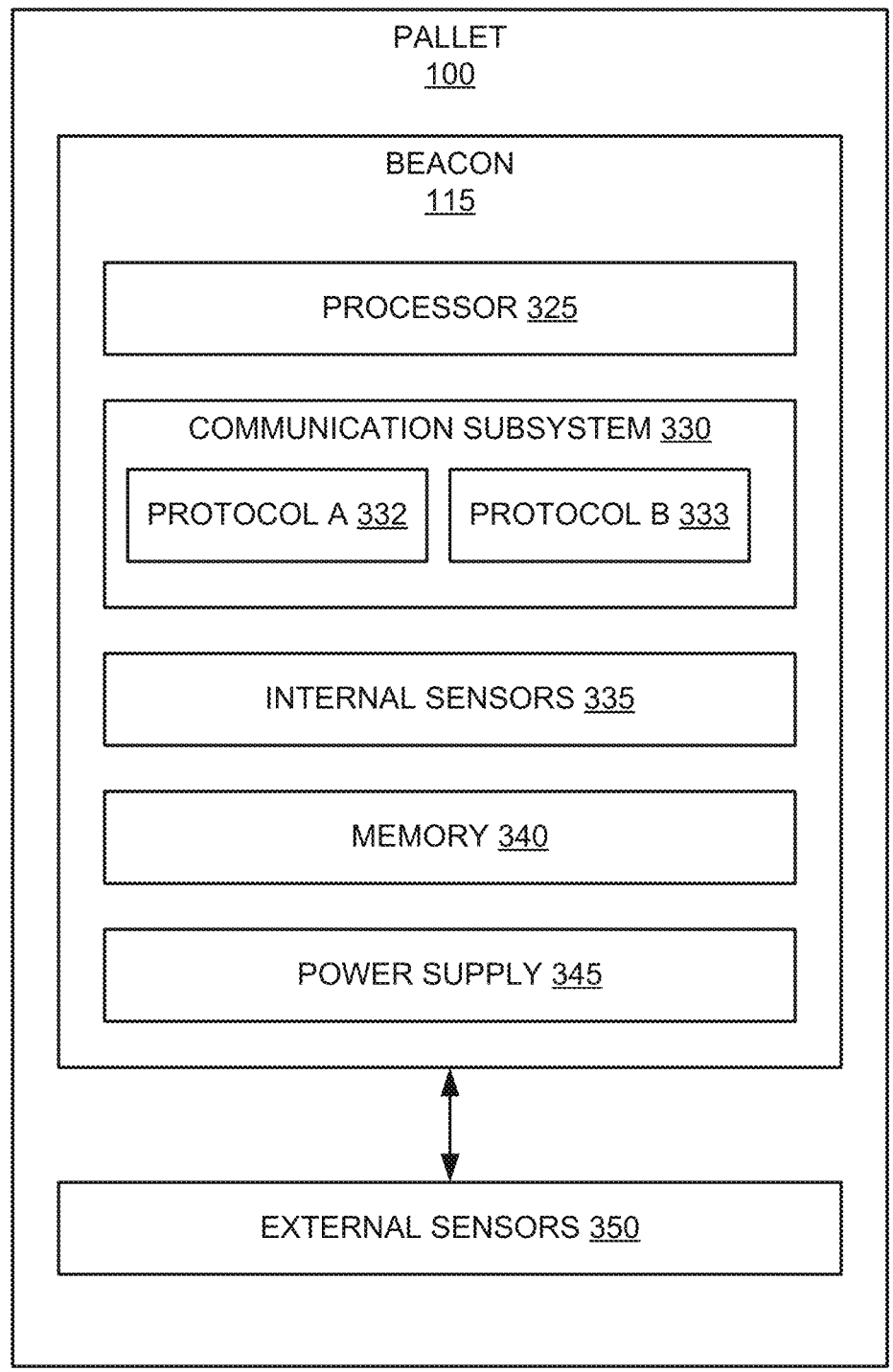
FIG. 3 is a block diagram illustrating a pallet, in accordance with some embodiments.

The pallet 100 may include components for performing multiple functions, as described herein. FIG. 3 is a block diagram illustrating the system components of the pallet 100, in accordance with some embodiments. The pallet 100 may include a beacon 115 in operative communication with one or more external sensors 350. In some embodiments, the pallet 100 may further include a barcode. The beacon 115 may include device hardware coupled to a memory 340. The device hardware may include a processor 325, a communication subsystem 330, internal sensors 335, and a power supply 345. In some embodiments, the beacon 115 may be implemented as an active tag (e.g., an RFID tag). The beacon 115 may be associated with an identifier (e.g., an active tag identifier), as well as the barcode, if used.

The processor 325 may be implemented as one or more integrated circuits (e.g., one or more single core or multicore microprocessors and/or microcontrollers), and may be used to control the operation of the beacon 115. The processor 325 can execute a variety of programs in response to program code or computer-readable code stored in memory 340, and can maintain multiple concurrently executing programs or processes. The communication subsystem 330 may include one or more transceivers and/or connectors that can be used by the beacon 115 to communicate with other devices (e.g., the external sensors 350, access devices, etc.) and/or to connect with external networks. In some embodiments, the communication subsystem 330 may be configured to communicate using more than one protocol (e.g., protocol A 332 and protocol B 333). Protocol A 332 and protocol B 333 may be two different wired or wireless communication technologies. For example, protocol A 332 and protocol B 333 may be selected from the group including Bluetooth, Bluetooth LE, near field communication, WiFi, cellular communication (including narrowband IoT), Ethernet, fiber optics, etc.

The particular technology or protocol used for a particular communication may be determined based on any of a number of factors, including availability, signal strength, type and/or amount of power received from or remaining on power supply 345, data throughput, type of data to be communicated, size of data to be communicated, and the like. For example, narrowband IoT may be selected to communicate on a low power wide area network (LPWAN) as opposed to a regular cellular protocol (e.g., 3G, 4G, LTE, etc.). In this example, narrowband IoT may present slower speeds, but also may use less power than a regular cellular protocol and therefore conserve battery life. Narrowband IoT may also be selected instead of Bluetooth for a particular communication because narrowband IoT may be capable of transmitting a higher data volume and does not require proximity to a reader. Thus, narrowband IoT may present better coverage than Bluetooth.

In some embodiments, protocol A 332 and protocol B 333 may be selected differently for different purposes. For example, protocol A 332 may be narrowband IoT, and protocol B 333 may be Bluetooth. Protocol A 332 may be used to transmit data from sensors 335 and/or sensors 350 to the cloud or to a remote entity or computer, as described further herein. Protocol B 333 may be used to transmit data (e.g., promotional data) to mobile devices proximate to the pallet 100, such as mobile devices used by users within a threshold distance of the pallet 100. These separate protocols 332, 333 may be useful in that the mobile devices communicating via protocol B 333 may not be capable of using protocol A 332, or it may not be desirable for the mobile devices to communicate via protocol A 332 (based on, e.g., power consumption, amount of data being communicated, data consumption, etc.).

The internal sensors 335 may include any movement-related, location-related, and/or environmental-related sensors. For example, the internal sensors 335 may include a global positioning system (GPS), an accelerometer, a gyroscope, a barometer, a thermometer, a humidity sensor, a light sensor, a microphone, combinations thereof, and/or the like. The internal sensors 335 may be coupled to the communication subsystem 330, such that sensor measurements may be transmitted off of the pallet 100 to other devices or systems, as described further herein.

The memory 340 may be implemented using any combination of any number of non-volatile memories (e.g., flash memory) and volatile memories (e.g., DRAM, SRAM), or any other non-transitory storage medium, or a combination thereof media. In some embodiments, the memory 340 may be included in the processor 325. The power supply 345 may include any wired or wireless power supply, such as a power outlet supply, a solar panel, and/or a battery.

The beacon 115 may be coupled to one or more external sensors 350 on the pallet 100. The external sensors 350 may include, for example, a weight sensor as described further herein. In such an example, the weight sensor may include circuitry that measures the weight of a load on the pallet 100 (e.g., circuitry 225 or any other suitable circuitry for measuring weight of a load). In the case of circuitry 225, the circuitry 225 may communicate (either via a wired or wireless connection) resistance changes caused by changes in load on the pallet 100, and transmit those changes to the beacon 115. The beacon may use the communication subsystem 330 to transmit this data off of the pallet 100 to other devices or systems, as described further herein.

Systems for Tracking Promotions

In some cases, the load placed on a pallet may be intended for promotional use. For example, a physical asset (which may be used herein to refer to one or more different or similar physical assets) may be placed on a pallet at a manufacturer and transported to a store for display, advertisement, marketing, sampling, education, training, interaction, and/or purchase of the physical asset by users. The pallet may include one or more unique identifiers, such as a barcode and/or a beacon identifier. The one or more unique identifiers may be stored in association with the physical asset(s) located on that pallet.

Figure 4:
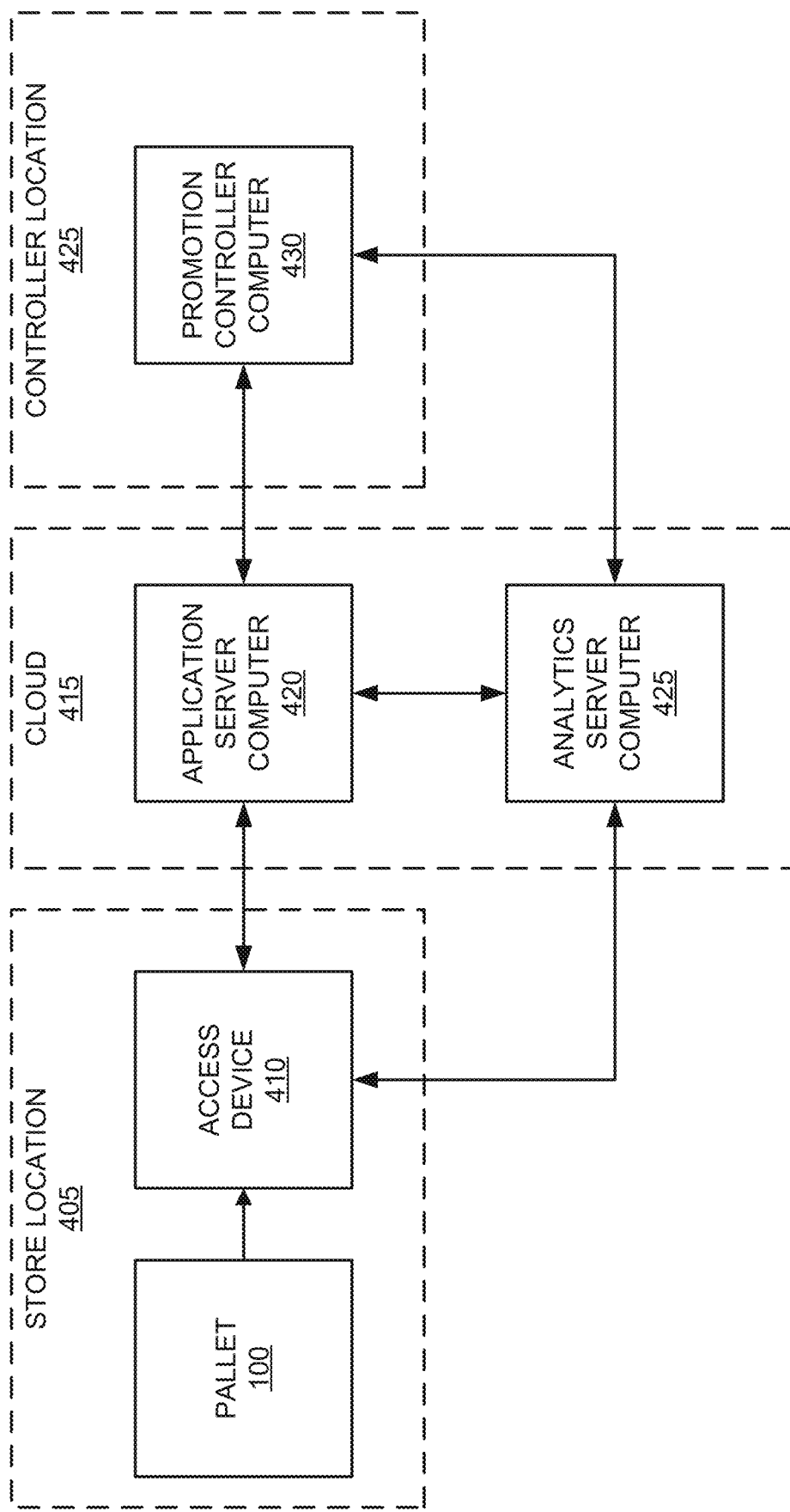
FIG. 4 is a block diagram illustrating a system for tracking promotions, in accordance with some embodiments.

FIG. 4 is a block diagram illustrating a system for tracking promotions, in accordance with some embodiments. The system may include a pallet 100, an access device 410, an application server computer 420, an analytics server computer 425, and a promotion controller computer 430. The pallet 100 and the access device 410 may be located at a user location 405, such as a store. The application server computer 420 and the analytics server computer 425 may be located in the cloud, such as at one or more offsite or third party locations. The promotion controller computer 430 may be located at a controller location 425, such as a manufacturer headquarters. Although shown and described with respect to a certain number of entities performing certain functions, it is contemplated that a greater or fewer number of entities may perform the functions described herein. For example, the functions of the analytics server computer 425 and/or the application server computer 420 may be spread across multiple server computers. In another example, the functions of the application server computer 420 and the analytics server computer 425 may be performed by a single entity.

The pallet 100 may communicate data to the access device 410 to cause the access device 410 to perform one or more operations. For example, the pallet 100 may communicate (or cause to be communicated) promotional data to the access device 410 as the access device 410 approaches the pallet 100. In another example, the pallet 100 may communicate sensor data to the access device 410 relating to the promotion. The communicated data may include at least one identifier associated with the pallet 100. The access device 410 may display this information to a user of the access device 410 via an application installed on the access device 410.

The access device 410 may be any suitable electronic user device. A device may include a communication device. A communication device may provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. A device may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 410 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like.

The application installed on the access device 410 may be published and/or maintained by an application server computer 420. The application server computer 420 may source and update the application, as well as provide supplemental data to the application. For example, in some embodiments, the access device 410 may receive an identifier associated with the pallet 100 when entering the store location 405. The access device 410 may forward that identifier to the application server computer 420 to retrieve information about the physical asset on the pallet 100 to be displayed on the access device 410.

The access device 410 may be in communication with the analytics server computer 425. The access device 410 may forward the identifier of the pallet 100 and its associated sensor data to the analytics server computer 425. The analytics server computer 425 may perform data management, aggregation and analysis functions. For example, the analytics server computer 425 may analyze the location and position of the pallet 100 to determine whether it is at the correct location and position at the proper time. In another example, the analytics server computer 425 may analyze the weight of the pallet 100 to determine whether the physical asset needs to be replenished and/or to determine the amount of the physical asset that has been depleted. In still another example, the analytics server computer 425 may combine data from multiple pallets 100 at multiple store locations 405 to determine the aggregate performance of a particular promotion, e.g., the amount of demand for the physical asset at multiple store locations.

The application server computer 420 may further provide an application to the promotion controller computer 430 for display and filtering of data received from the analytics server computer 425. The promotion controller computer 430 may be, for example, operated by a manufacturer of the physical asset being promoted at the store location 405. In other examples, the promotion controller computer 430 may be operated by a company, a researcher, and/or the like. The promotion controller computer 430 may display the data received from the analytics server computer 425 to determine the quality of performance of the promotion.

Figure 5:
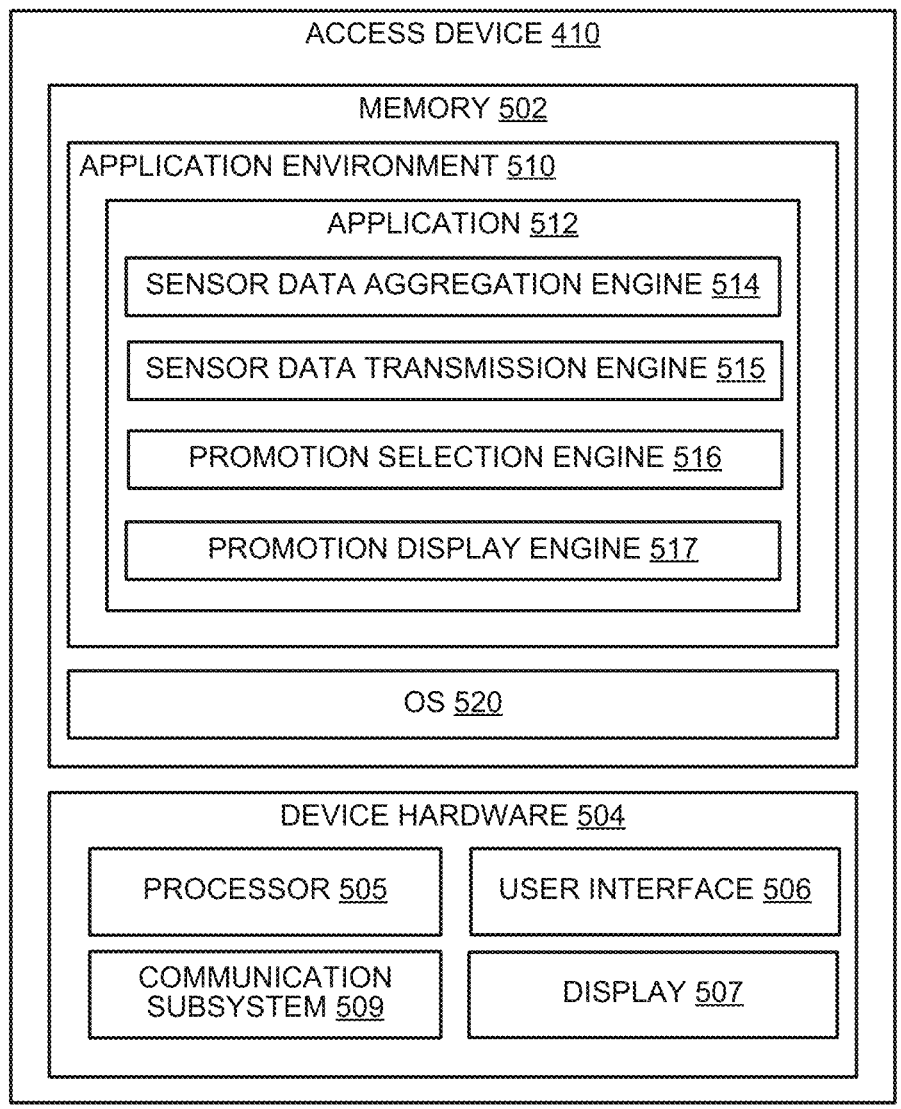
FIG. 5 is a block diagram illustrating an access device, in accordance with some embodiments.

FIG. 5 is a block diagram illustrating an access device 410, in accordance with some embodiments. The access device 410 may include device hardware 504 coupled to a memory 502. Device hardware 504 may include a processor 505, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 410. Processor 505 can execute a variety of programs in response to program code or computer-readable code stored in memory 502, and can maintain multiple concurrently executing programs or processes. Communication subsystem 509 may include one or more transceivers and/or connectors that can be used by access device 410 to communicate with other devices (e.g., the pallet 100) and/or to connect with external networks (e.g., to connect to the application server computer 420 and/or the analytics server computer 425). User interface 506 can include any combination of input and output elements to allow a user to interact with and invoke the functionalities of the access device 410. In some embodiments, user interface 506 may include a component such as display 507 that can be used for both input and output functions. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that receives, stores, and/or transmits pallet identifiers and sensor data. In some embodiments, application 512 may be an application that displays promotions based on proximity to a pallet. In some embodiments (such as the embodiment illustrated in FIG. 5), application 512 performs both functions. Application 512 may include a sensor data aggregation engine 514, a sensor data transmission engine 515, a promotion selection engine 516, and a promotion display engine 517. In some embodiments, one or more of these components can be provided by another application or component that is not part of application 512.

The sensor data aggregation engine 514 may be configured to, in conjunction with the processor 505, receive sensor data from the pallet, along with a pallet identifier. Sensor data aggregation engine 514 may be configured to, in conjunction with the processor 505, aggregate the sensor data associated with that identifier for transmission off of the access device 410. For example, the sensor data aggregation engine 514 may collect sensor data from one or more sensors of the beacon of the pallet over a fixed or variable period of time (e.g., over 10 minutes, halfway through the promotion, until half of the physical asset is depleted, etc.). In another example, the sensor data aggregation engine 514 may collect sensor data from multiple sensors at a single point in time. The sensor data aggregation engine 514 may then combine the sensor data associated with that identifier into a data packet suitable for transmission.

The sensor data transmission engine 515 may be configured to, in conjunction with the processor 505, receive a data packet including the sensor data and the identifier from the sensor data aggregation engine 514. In some embodiments, the sensor data transmission engine 515 may perform compression functions on the data packet to reduce the size of the data packet to be transmitted. The sensor data transmission engine 515 may transmit the data packet via the communication subsystem 509 to an analytics server computer for computations and analysis of the data.

The promotion selection engine 516 may be configured to, in conjunction with the processor 505, receive a pallet identifier from a pallet within communication range of the access device 410. For example, for a pallet having a beacon with a communication range of 50 feet, the beacon may transmit the pallet identifier to the access device 410 when it comes within 50 feet. In some embodiments, the promotion selection engine 516 may use the pallet identifier to locate a promotion (e.g., an advertisement, a discount, a coupon, etc.) already stored on the access device 410. In some embodiments, the promotion selection engine 516 may receive the pallet identifier and transmit it to an application server computer (or another server computer), the latter of which uses the pallet identifier to locate a promotion and return it to the access device 410. In some embodiments, multiple promotions may be retrieved.

The promotion display engine 517 may be configured to, in conjunction with the processor 505, receive one or more promotions from the promotion selection engine 516. The promotion display engine 517 may cause the promotion to be displayed by display 507 immediately or at a certain future time (e.g., when the access device 410 within a closer distance of the pallet, when the access device 410 is moving away from the pallet, after the access device 410 has left the store location, etc.). When multiple promotions are received from the promotion selection engine 516, the promotion display engine 517 may cause the display 507 to display the promotions side by side at the same time on the access device 410 or in sequence. The sequence of the displayed promotions may be determined according to any criteria, such as the value of the promotion, the price paid by the manufacturer or advertiser for the promotion, characteristics of the user of the access device 410 (e.g., demographic information), and/or the like.

Figure 6:
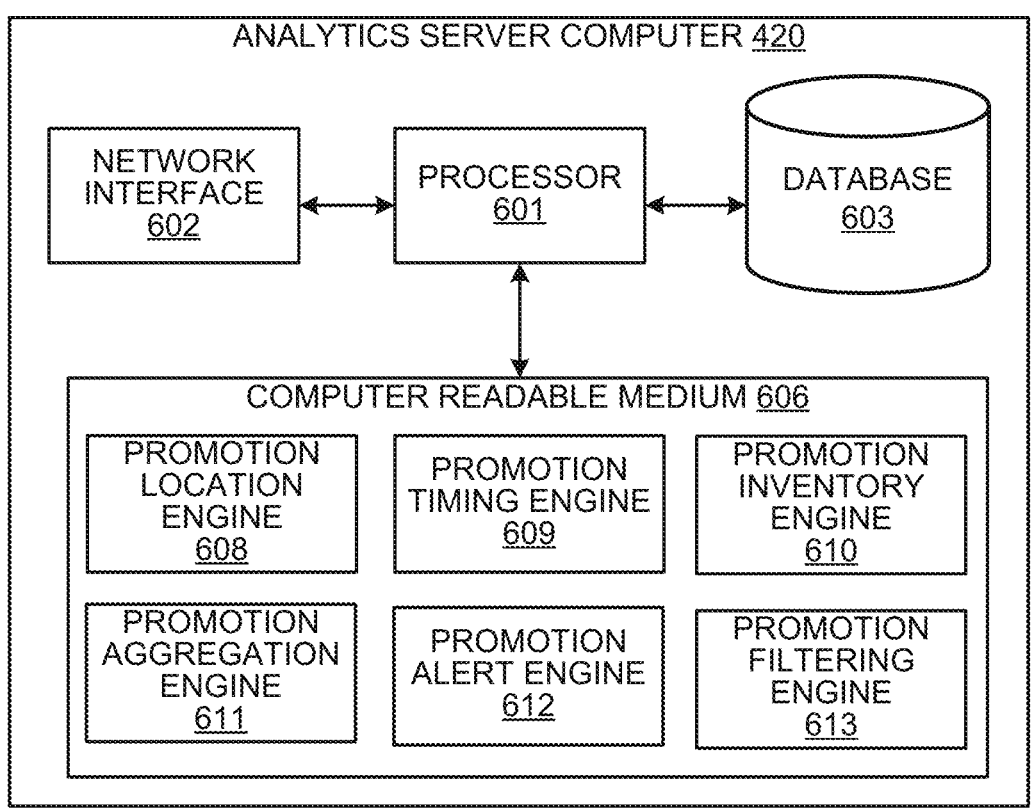
FIG. 6 is a block diagram illustrating an analytics server computer, in accordance with some embodiments.

FIG. 6 is a block diagram illustrating an analytics server computer 420, in accordance with some embodiments. Analytics server computer 420 may include a processor 601 coupled to a network interface 602 and a computer readable medium 606. Analytics server computer 420 may also include or otherwise have access to a database 603 that may be internal or external to the analytics server computer 420.

Processor 601 may include one or more microprocessors to execute program components for performing the promotion analysis functions of the analytics server computer 420. Network interface 602 may be configured to connect to one or more communication networks to allow the analytics server computer 420 to communicate with other entities, such as the access device, the promotion controller computer, etc. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the promotion analysis functions of analytics server computer 420. For example, computer readable medium 606 may include code implementing a promotion location engine 608, a promotion timing engine 609, a promotion inventory engine 610, a promotion aggregation engine 511, a promotion alert engine 612, and a promotion filtering engine 613.

The promotion location engine 608 may, in conjunction with the processor 601, receive a location (e.g., at a store) and position (e.g., within the store) of the pallet (along with the pallet identifier) from the access device. For example, the promotion location engine 608 may receive a physical address (e.g., obtained from GPS on the beacon of the pallet) and coordinates within the physical address (e.g., obtained from triangulating signal strength of the beacon of the pallet with respect to multiple WiFi routers within the physical address or cellular towers near the physical address). The promotion location engine 608 may retrieve, using the pallet identifier, the expected location and the expected position of the pallet from the database 603. The promotion location engine 608 may compare the received location to the expected location and determine if they are within a threshold distance (e.g., within 200 feet). If they are not within a threshold distance, the promotion location engine 608 may generate and send a notification to the promotion alert engine 612 indicating that the pallet is not at the proper location.

If the received location is within a threshold distance of the expected location, the promotion location engine 608 may compare the received position to the expected position and determine if they are within a threshold distance (e.g., within 20 feet). If they are not within a threshold distance, the promotion location engine 608 may generate and send a notification to the promotion alert engine 612 indicating that the pallet is not at the proper position within the location.

The promotion timing engine 609 may, in conjunction with the processor 601, receive timing data associated with the pallet arriving at and departing the expected location and the expected position, along with the pallet identifier, from the access device. The promotion timing engine 609 may retrieve, using the pallet identifier, the times at which the pallet is supposed to be at the expected location and the times at which the pallet is supposed to be at the expected position from the database 603. The promotion timing engine 609 may compare the received location arrival and departure timing to the expected location arrival and departure timing and determine if the pallet arrived at and departed the location at its expected time. If it did not arrive at its expected time, the promotion timing engine 609 may generate and send a notification to the promotion alert engine 612 indicating that the pallet did not arrive at the location at the expected time.

The promotion timing engine 609 may compare the received position arrival and departure timing to the expected position arrival and departure timing and determine if the pallet arrived and departed the position at its expected time. If it did not arrive at its expected time, the promotion timing engine 609 may generate and send a notification to the promotion alert engine 612 indicating that the pallet did not arrive or depart the position at the expected time (e.g., the pallet was still in storage at the back of the store instead of on the floor).

The promotion inventory engine 610 may, in conjunction with the processor 601, receive or determine a weight of the pallet from the access device. In some embodiments, the weight sensor of the pallet may directly provide the weight of the load to the access device. In some embodiments, the weight sensor of the pallet may provide data indicative of the weight of the load instead, such as a change in resistance. In the latter embodiments, the promotion inventory engine 610 may use the data indicative of the weight to determine the weight of the load. In still other embodiments, the access device may use the data indicative of the weight to determine the weight of the load, then provide the weight of the load to the promotion inventory engine 610. As used herein, the term "load" may refer to one or more physical assets located on the pallet.

The promotion inventory engine 610 may, in conjunction with the processor 601, retrieve an initial weight of the load of the pallet from database 603. The initial weight of the load may be known (e.g., provided from the manufacturer and/or shipper), and/or may be measured by the weight sensor of the pallet before the promotion begins. The promotion inventory engine 610 may compared the received weight of the pallet from the access device to the initial weight. If the received weight is below a threshold (e.g., less than 20% of the initial weight), the promotion inventory engine 610 may send a notification to the promotion alert engine 612 indicating that the pallet needs to be replenished. In some embodiments, the promotion inventory engine 610 may determine an amount of the physical asset that has been depleted based on the initial and current weight of the pallet. This information may be used, for example, to determine demand and/or performance of the physical asset on the pallet, such as when the weight of the individual units of the physical asset are known.

The promotion aggregation engine 611 may, in conjunction with the processor 601, receive data from multiple pallets relating to multiple promotions at multiple locations. The promotion aggregation engine 611 may aggregate data according to any criteria. For example, the promotion aggregation engine 611 may aggregate all promotion data relating to a single manufacturer. In another example, the promotion aggregation engine 611 may aggregate all promotion performance data relating to a single store location. In another example, the promotion aggregation engine 611 may aggregate all pallet data relating to a single promotion. In another example, the promotion aggregating engine 611 may aggregate all sensor data for one pallet relating to one promotion at one location.

Figure 7A:
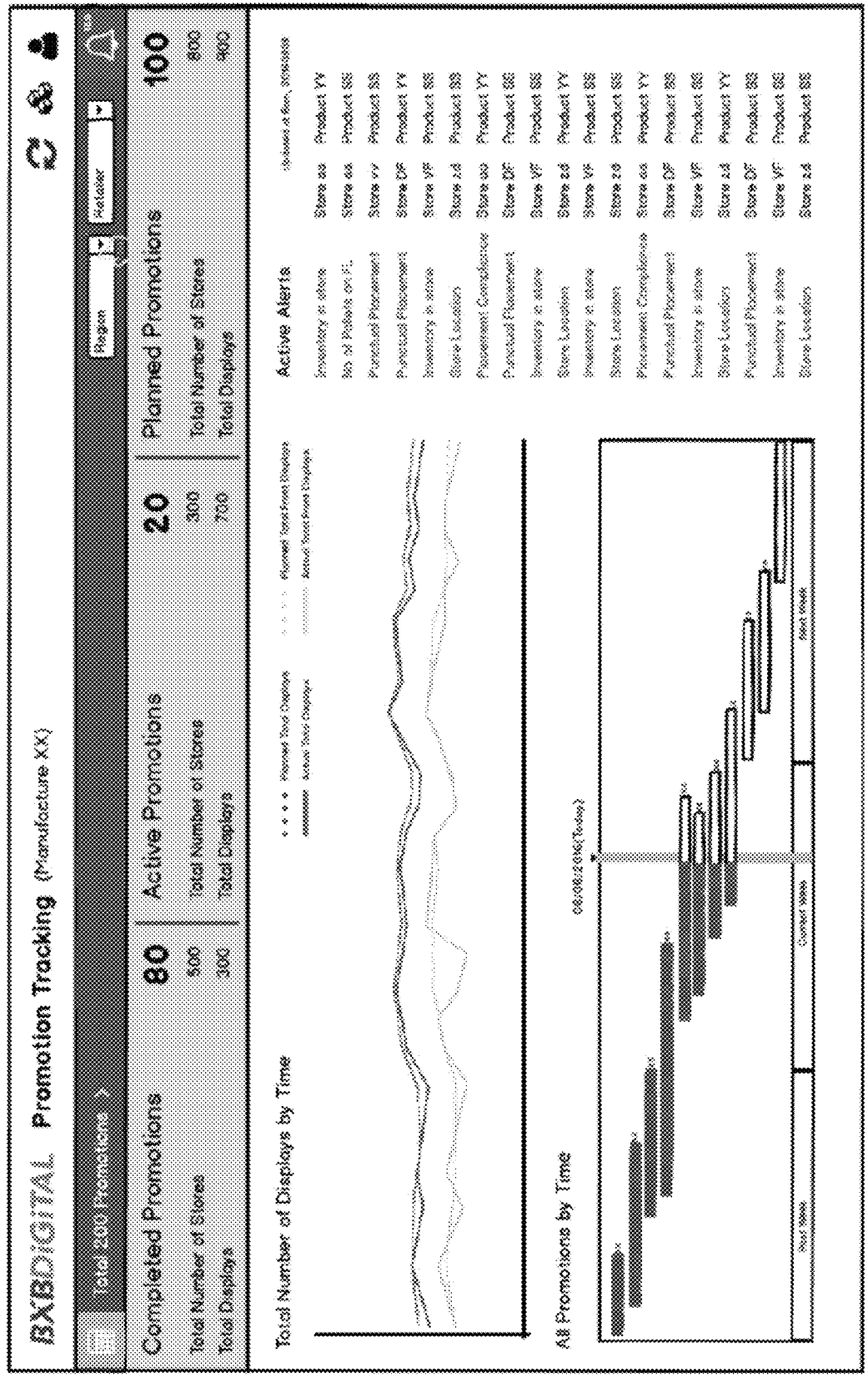
FIG. 7A is a screen shot of a graphical user interface (GUI) for tracking promotions, in accordance with some embodiments.

The promotion aggregation engine 611 may be configured to transmit the aggregated data for display on an access device at the store location and/or a promotion controller computer. In some embodiments, the aggregated data may be displayed via a web application. FIG. 7A is a screen shot of a graphical user interface (GUI) 700A for tracking promotions and displaying aggregated data, in accordance with some embodiments. GUI 700A may display aggregated data for all promotions associated with manufacturer XX. GUI 700A may further display statistics in both lists and graphs (e.g., completed promotions, active promotions, planned promotions, total number of stores, total displays, total number of displays by time, all promotions by time, etc.). GUI 700A may further display alerts related to active promotions, including the stores and products related to those alerts.

Turning back to FIG. 6, the promotion alert engine 612 may, in conjunction with the processor 601, receive notifications from the promotion location engine 608, the promotion timing engine 609, and/or the promotion inventory engine 610. Based on the type of notification, the promotion alert engine 612 may generate and send an alert to the access device and/or the promotion controller computer. For example, the access device may only receive an alert that a pallet is less than 20% full, while both the access device and the promotion controller computer may receive an alert that the pallet is entirely depleted. The promotion alert engine 612 may generate and send the alert at any time, including in real time (e.g., as the promotion is occurring and/or as errors are detected), after the promotion is over, etc.

The promotion filtering engine 613 may, in conjunction with the processor 601, apply filtering to aggregated data to be displayed on the access device and/or the promotion controller computer. For example, the promotion filtering engine 613 may provide a plurality of criteria upon which the data may be filtered (e.g., specific manufacturers, specific promotions, specific pallets, specific store locations, specific alerts, etc.). The promotion filtering engine 613 may receive a user selection of one or more criteria, and use that criteria to return only data pertaining to the selected criteria.

Figure 7B:
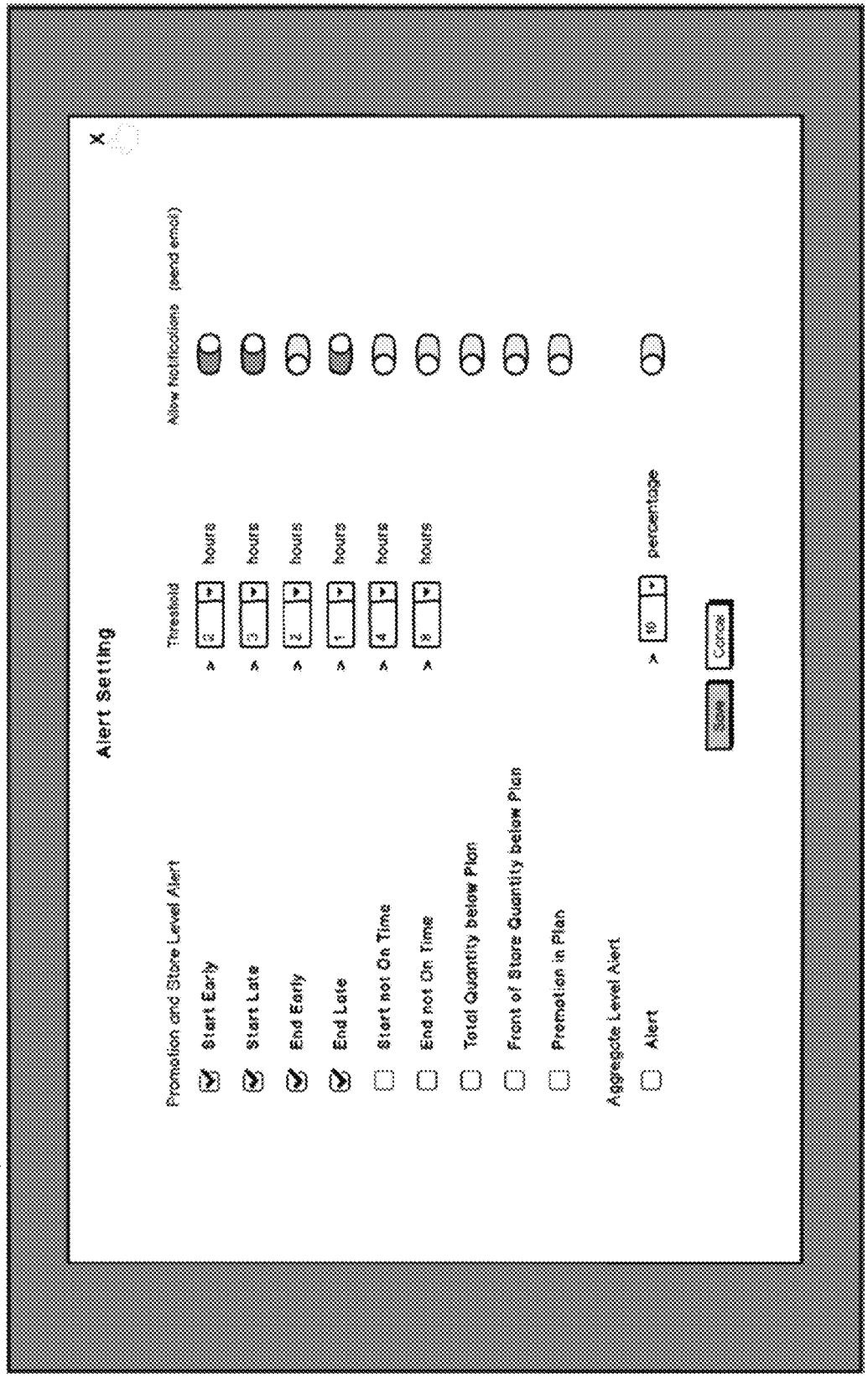
FIG. 7B is a screen shot of a graphical user interface (GUI) for configuring alerts, in accordance with some embodiments.

FIG. 7B is a screen shot of a graphical user interface (GUI) 700B for configuring alerts, in accordance with some embodiments. GUI 700B may be used by a user of an access device or a promotion controller computer to filter which alerts are provided. GUI 700B allows selection of alerts based on the promotion starting early, the promotion starting late, the promotion ending early, the promotion ending late, the promotion not starting on time, the promotion not ending on time, the total quantity of the physical asset being below the planned quantity, the front of store quantity of the physical asset being below the planned quantity, combinations thereof, and/or the like. GUI 700B further allows selection of thresholds by which to compared the expected and actual data. GUI 700B further provides toggles that allow an alert to be turned on or off, including a toggle for an aggregate level alert associated with an aggregate level threshold.

Methods for Tracking Promotions

Figure 8:
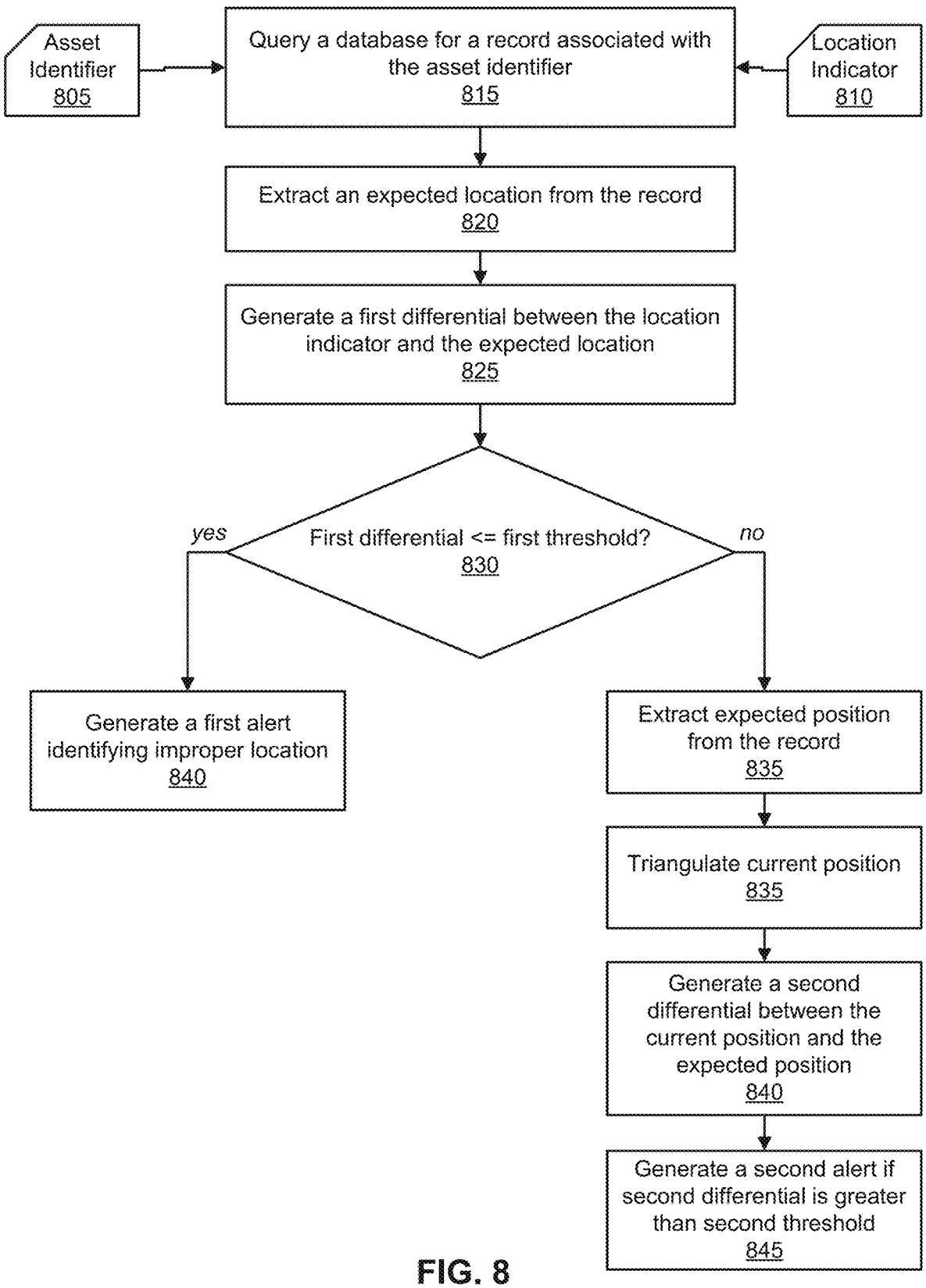
FIG. 8 is a flow chart illustrating a method for tracking promotions, in accordance with some embodiments.

A variety of methods may be implemented by the above-described systems. FIG. 8 is a flow chart illustrating an exemplary method for tracking promotions, in accordance with some embodiments. At process block 815, an asset identifier 805 and a location indicator 810 is received. The asset identifier 805 is acquired from a beacon coupled to a pallet including a physical asset. The asset identifier 805 uniquely identifies the physical asset. The physical asset is associated with an entity. The entity may be, for example, a manufacturer. In some embodiments, the location indicator 810 is received from a tracking device associated with the beacon. The location indicator 810 may be received using a first communication protocol associated with the beacon. In some embodiments, the location indicator 810 may be generated through a facility matching and localization process, such as that described in U.S. Provisional Patent Application No. 62/500,461, filed May 2, 2017, which is herein incorporated by reference in its entirety. Further at process block 815, a database is queried for a record associated with the asset identifier that uniquely identifies the physical asset.

At process block 820, an expected location for the physical asset is extracted from the record associated with the asset identifier. At process block 825, a first differential between the location indicator and the expected location is generated. A first threshold is determined. At decision block 830, it is determined whether the first differential is less than or equal to the first threshold (i.e., whether the actual location of the physical asset is within a certain distance of the expected location of the physical asset). If the first differential is greater than the first threshold, the method continues at process block 840. At process block 840, a first alert is generated and transmitted that identifies an improper location of the physical asset.

If the first differential is less than or equal to the first threshold (i.e., the actual location is close enough to the expected location of the physical asset), the method continues at process block 835. At process block 835, the database is queried for the asset identifier, and an expected position of the physical asset is extracted from the record. The expected position may define a point within the expected location. At process block 835, the current position of the beacon within the expected location is triangulated. The current position is triangulated using one or more data pings over a second communication protocol associated with the beacon. The second communication protocol may be different than the first communication protocol.

At process block 840, a second differential between the current position and the expected position is generated. A second threshold is determined. If the second differential is greater than the second threshold, the method continues at process block 845. At process block 845, a second alert is generated and transmitted that identifies an improper position of the physical asset within the location (e.g., the physical asset is at the back of the store instead of the front of the store). In some embodiments, no alerts are generated if the second differential is less than or equal to the second threshold, because the physical asset is at the proper location and position.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A computer-implemented method comprising:
   acquiring an asset identifier from a beacon coupled to a pallet including a physical asset, wherein the asset identifier identifies the physical asset, and wherein the physical asset is associated with an entity;
   receiving a location indicator from a tracking device associated with the beacon, wherein the location indicator is received using a first communication protocol associated with the beacon;
   acquiring sensor data from one or more sensors of the beacon over a time interval;
   aggregating the sensor data over the time interval and combining the sensor data into a data packet for transmission;
   performing a compression function on the data packet to reduce the size of the data packet before transmission;
   querying a database for a record associated with the asset identifier that uniquely identifies the physical asset;
   extracting an expected location of the physical asset from the record associated with the asset identifier;
   determining a first threshold;
   generating a first differential between the location indicator and the expected location;
   determining that the first differential is less than or equal to the first threshold;
   in response to determining that the first differential is less than or equal to the first threshold, identifying a promotion for the physical asset based on the asset identifier; and
   causing the promotion to be dynamically displayed on a display interface together with a plurality of promotions for a plurality of other physical assets as the plurality of other physical assets move in and out of range;
   extracting an expected position of the physical asset from the record associated with the asset identifier;
   triangulating a current position of the beacon within the expected location, wherein the current position is triangulated using one or more data pings, and wherein the current position is triangulated over a second communication protocol associated with the beacon;
   determining a second threshold; and
   generating a second differential between the current position and the expected position, wherein when the second differential is greater than the second threshold, a position alert identifying an improper position of the physical asset is generated and transmitted.

2. The computer-implemented method of claim 1, wherein the first communication protocol is different than the second communication protocol.

3. The computer-implemented method of claim 1, wherein the expected position defines a point within the expected location.

4. The computer-implemented method of claim 1, wherein the position alert is transmitted to the entity.

5. The computer-implemented method of claim 1, further comprising:
   extracting initial weight data of the physical asset from the record associated with the asset identifier;
   receiving current weight data of the physical asset from a sensor associated with the beacon;
   determining a third threshold; and
   generating a third differential between the current weight data and the initial weight data, wherein when the third differential is greater than the third threshold, a depletion alert identifying depletion of the physical asset is generated and transmitted.

6. The computer-implemented method of claim 1, further comprising:
determining one or more devices in proximity to the physical asset using the beacon; and
transmitting a notification relating to the physical asset to the one or more devices.

7. The computer-program product tangibly embodied in a non-transitory machine-readable storage medium of a device, including instructions that, when executed by one or more processors, cause the one or more processors to:
acquire an asset identifier from a beacon coupled to a pallet including a physical asset, wherein the asset identifier identifies the physical asset, and wherein the physical asset is associated with an entity;
receive a location indicator from a tracking device associated with the beacon, wherein the location indicator is received using a first communication protocol associated with the beacon;
acquire sensor data from one or more sensors of the beacon over a time interval;
aggregate the sensor data over the time interval and combining the sensor data into a data packet for transmission;
perform a compression function on the data packet to reduce the size of the data packet before transmission;
query a database for a record associated with the asset identifier that uniquely identifies the physical asset;
extract an expected location of the physical asset from the record associated with the asset identifier;
determine a first threshold;
generate a first differential between the location indicator and the expected location;
determine that the first differential is less than or equal to the first threshold;
in response to determining that the first differential is less than or equal to the first threshold, identify a promotion for the physical asset based on the asset identifier; and
cause the promotion to be dynamically displayed on a display interface together with a plurality of promotions for a plurality of other physical assets as the plurality of other physical assets move in and out of range;
extract an expected position of the physical asset from the record associated with the asset identifier;
triangulate a current position of the beacon within the expected location, wherein the current position is triangulated using one or more data pings, and wherein the current position is triangulated over a second communication protocol associated with the beacon;
determine a second threshold; and
generate a second differential between the current position and the expected position, wherein when the second differential is greater than the second threshold, a position alert identifying an improper position of the physical asset is generated and transmitted.

8. The computer-program product of claim 7, wherein the first communication protocol is different than the second communication protocol.

9. The computer-program product of claim 7, wherein the expected position defines a point within the expected location.

10. The computer-program product of claim 7, wherein the position alert is transmitted to the entity.

11. The computer-program product of claim 7, wherein the instructions further cause the one or more processors to:
extract initial weight data of the physical asset from the record associated with the asset identifier;
receive current weight data of the physical asset from a sensor associated with the beacon;
determine a third threshold; and
generating a third differential between the current weight data and the initial weight data, wherein when the third differential is greater than the third threshold, a depletion alert identifying depletion of the physical asset is generated and transmitted.

12. The computer-program product of claim 7, wherein the instructions further cause the processors to:
determine one or more devices in proximity to the physical asset using the beacon; and
transmit a notification relating to the physical asset to the one or more devices.

13. A device comprising:
a processor; and
a memory coupled to the processor, the memory storing instructions which when executed by the processor, cause the device to perform operations including:
acquiring an asset identifier from a beacon coupled to a pallet including a physical asset, wherein the asset identifier identifies the physical asset, and wherein the physical asset is associated with an entity;
receiving a location indicator from a tracking device associated with the beacon, wherein the location indicator is received using a first communication protocol associated with the beacon;
acquiring sensor data from one or more sensors of the beacon over a time interval;
aggregating the sensor data over the time interval and combining the sensor data into a data packet for transmission;
performing a compression function on the data packet to reduce the size of the data packet before transmission;
querying a database for a record associated with the asset identifier that uniquely identifies the physical asset;
extracting an expected location of the physical asset from the record associated with the asset identifier;
determining a first threshold;
generating a first differential between the location indicator and the expected location;
determining that the first differential is less than or equal to the first threshold;
in response to determining that the first differential is less than or equal to the first threshold, identifying a promotion for the physical asset based on the asset identifier; and
causing the promotion to be dynamically displayed on a display interface together with a plurality of promotions for a plurality of other physical assets as the plurality of other physical assets move in and out of range;
extracting an expected position of the physical asset from the record associated with the asset identifier;
triangulating a current position of the beacon within the expected location, wherein the current position is triangulated using one or more data pings, and wherein the current position is triangulated over a second communication protocol associated with the beacon;
determining a second threshold; and generating a second differential between the current position and the expected position, wherein when the second differential is greater than the second threshold, a position alert identifying an improper position of the physical asset is generated and transmitted.

14. The device of claim 13, wherein the first communication protocol is different than the second communication protocol.

15. The device of claim 13, wherein the expected position defines a point within the expected location.

16. The device of claim 13, wherein the position alert is transmitted to the entity.

17. The device of claim 13, wherein the operations further include:
   extracting initial weight data of the physical asset from the record associated with the asset identifier;
   receiving current weight data of the physical asset from a sensor associated with the beacon;
   determining a third threshold; and
   generating a third differential between the current weight data and the initial weight data, wherein when the third differential is greater than the third threshold, a depletion alert identifying depletion of the physical asset is generated and transmitted.

18. The device of claim 13, wherein the operations further include:
   determining one or more devices in proximity to the physical asset using the beacon; and
   transmitting a notification relating to the physical asset to the one or more devices.

* * * * *